(12) United States Patent
Woodard et al.

(10) Patent No.: US 11,893,742 B2
(45) Date of Patent: Feb. 6, 2024

(54) ACCELERATED SEGMENTATION FOR REVERSE ENGINEERING OF INTEGRATED CIRCUITS

(71) Applicant: UNIVERSITY OF FLORIDA RESEARCH FOUNDATION, INCORPORATED, Gainesville, FL (US)

(72) Inventors: Damon Woodard, Newberry, FL (US); Domenic J. Forte, Gainesville, FL (US); Navid Asadi-Zanjani, Gainesville, FL (US); Ronald Wilson, Gainesville, FL (US)

(73) Assignee: UNIVERSITY OF FLORIDA RESEARCH FOUNDATION, INCORPORATED, Gainesville, FL (US)

(*) Notice: Subject to any disclaimer, the term of this patent is extended or adjusted under 35 U.S.C. 154(b) by 425 days.

(21) Appl. No.: 17/378,438

(22) Filed: Jul. 16, 2021

(65) Prior Publication Data
US 2022/0028086 A1 Jan. 27, 2022

Related U.S. Application Data

(60) Provisional application No. 63/054,990, filed on Jul. 22, 2020.

(51) Int. Cl.
| | | |
|---|---|---|
| *G06T 7/11* | (2017.01) | |
| *G06T 7/136* | (2017.01) | |
| *G06T 7/194* | (2017.01) | |
| *G06T 7/44* | (2017.01) | |
| *G06T 7/40* | (2017.01) | |
| *G06T 5/20* | (2006.01) | |

(52) U.S. Cl.
CPC ............... *G06T 7/11* (2017.01); *G06T 5/20* (2013.01); *G06T 7/136* (2017.01); *G06T 7/194* (2017.01); *G06T 7/40* (2013.01); *G06T 2207/10061* (2013.01); *G06T 2207/20212* (2013.01); *G06T 2207/30148* (2013.01)

(58) Field of Classification Search
CPC  G06T 5/20; G06T 7/136; G06T 7/194; G06T 7/40; G06T 2207/10061; G06T 2207/20212; G06T 2207/30148
See application file for complete search history.

(56) References Cited

U.S. PATENT DOCUMENTS 11,270,439 B2 * 3/2022 Woodard ............... G06T 7/11

* cited by examiner

*Primary Examiner* — Bobbak Safaipour
*Assistant Examiner* — Ashley L. Hytrek
(74) *Attorney, Agent, or Firm* — Alston & Bird LLP

(57) ABSTRACT

Various embodiments of the present disclosure provide for accelerated segmentation for reverse engineering of integrated circuits. In one example, an embodiment provides for receiving an SEM image for an integrated circuit, performing filtering and binarization with respect to the SEM image, extracting information associated with filter sizes for the filtering, extracting signatures related to a distribution for background pixels and foreground pixels of the SEM image, extracting respective distance to mean signatures for the background pixels and the foreground pixels, and segmenting the SEM image based at least in part on the filter sizes and the respective distance to mean signatures to generate a segmented image for the integrated circuit.

25 Claims, 17 Drawing Sheets

```
Algorithm           with filter size "f"
1: I ← Load image with equal row and columns
2: r ← Number of rows in the image
3: Set i ← 1
4: for i < r do
5:    FilteredImage_i ← LowPassFilter(I, i)
6:    BinarizedImage_i ← GaussianMixtureModel(FilteredImage_i, components=2)
7:    i ← i + 1
8:    Save FilteredImage_i, BinarizedImage_i
9: end for
```

FIG. 3

Algorithm _____ with filter size "f"

1: I ← Load SEM image
2: BackgroundImage$_i$ = ElementWiseMultiply(BinarizedImage$_i$, I)
3: Set m ← 0
4: for m < r do
5:   Set n ← 0
6:   for n < c do
7:     If InvertedBinarizedImage$_i$[m, n] is 1 then
8:       InvertedBinarizedImage$_i$[m, n] ← 0
9:     else
10:       InvertedBinarizedImage$_i$[m, n] ← 1
11:     end if
12:     n ← n + 1
13:   end for
14:   m ← m + 1
15: end for
16: ForegroundImage$_i$ = ElementWiseMultiply(InvertedBinarizedImage$_i$, I)
17: Get frequency distribution for ForegroundImage$_i$, BackgroundImage$_i$ and save as FgdDist$_i$, BgdDist$_i$ respectively

FIG. 5

ACCELERATED SEGMENTATION FOR REVERSE ENGINEERING OF INTEGRATED CIRCUITS

CROSS-REFERENCE TO RELATED APPLICATIONS

This application claims the benefit of U.S. Provisional Patent Application No. 63/054,990, titled "LASRE: LARGE-SCALE ACCELERATED SEGMENTATION FOR REVERSE ENGINEERING OF INTEGRATED CIRCUITS," and filed on Jul. 22, 2020, which is incorporated herein by reference in its entirety.

TECHNICAL FIELD

The present application relates to the technical field of integrated circuits. In particular, the invention relates to segmentation of images associated with an integrated circuit.

BACKGROUND

Scanning Electron Microscopy (SEM) is an imaging technique for semiconductor technologies. For example, SEM is often employed for failure analysis of integrated circuits. In addition, with the recent growth of physical attacks on electronics with malicious intent, SEMs are becoming increasingly desirable for hardware assurance. For example, SEMs are becoming increasingly desirable for reverse engineering of integrated circuits. However, reverse engineering of integrated circuits generally involves long hours of imaging for an integrated circuit. For example, an estimated time of imaging for reverse engineering of an integrated circuit of size 1.5 mm×1.5 mm employing a 130 nm node technology is approximately 30 days. Therefore, with the ongoing trend of adding more structures onto a limited space on an integrated circuit, the imaging time frame for reverse engineering of an integrated circuit is becoming increasingly inefficient.

SUMMARY

In general, embodiments of the present invention provide methods, apparatus, systems, computing devices, computing entities, and/or the like for accelerated segmentation for reverse engineering of integrated circuits. The details of some embodiments of the subject matter described in this specification are set forth in the accompanying drawings and the description below. Other features, aspects, and advantages of the subject matter will become apparent from the description, the drawings, and the claims.

In an embodiment, a method for segmenting a Scanning Electron Microscopy (SEM) image of an integrated circuit (IC) is provided. The method provides for receiving an SEM image for an IC. The method also provides for performing filtering and binarization of the SEM image. The method also provides for extracting information associated with filter sizes for the filtering. The method also provides for extracting signatures associated with a distribution for background pixels and foreground pixels of the SEM image. The method also provides for extracting respective distance to mean signatures for the background pixels and the foreground pixels. Furthermore, the method provides for segmenting the SEM image based at least in part on the filter sizes and the respective distance to mean signatures to generate a segmented image for the IC.

In certain embodiments, the method also provides for splitting the SEM image into at least a first sub-image portion of the SEM image and a second sub-image portion of the SEM image based at least in part on a number of threads available to a processor associated with the image processing.

In certain embodiments, filtering and binarization of the SEM image comprises performing first filtering and binarization of the first sub-image portion. Additionally or alternatively, in certain embodiments, filtering and binarization of the SEM image comprises performing second filtering and binarization of the second sub-image portion.

In certain embodiments, extracting the signatures comprises extracting one or more first signatures associated with a first distribution for first background pixels and first foreground pixels of the first sub-image portion. Additionally or alternatively, in certain embodiments, extracting the signatures comprises extracting one or more second signatures associated with a second distribution for second background pixels and second foreground pixels of the second sub-image portion.

In certain embodiments, segmenting the SEM image comprises combining at least the first sub-image portion and the second sub-image portion to form a segmented version of the SEM image.

In certain embodiments, filtering and binarization of the SEM image comprises filtering the SEM image based at least in part on a first low-pass filter associated with a first cutoff frequency value to generate a first filtered SEM image. Additionally or alternatively, in certain embodiments, filtering and binarization of the SEM image comprises filtering the first filtered SEM image based at least in part on a second low-pass filter associated with a second cutoff frequency value to generate a second filtered SEM image.

In certain embodiments, extracting the information associated with the filter sizes for the filtering comprises determining an absolute sum of a difference in pixel intensity between the first filtered SEM image and the second filtered SEM image.

In certain embodiments, filtering and binarization of the SEM image further comprises filtering the SEM image based at least in part on a low-pass filter to generate a filtered SEM image. Additionally or alternatively, in certain embodiments, filtering and binarization of the SEM image further comprises applying the filtered SEM image to a Gaussian Mixture Model configured to generate a binarized SEM image.

In certain embodiments, extracting the signatures comprises extracting the one or more signatures from the binarized SEM image.

In certain embodiments, extracting the signatures comprises determining foreground texture data associated with the foreground pixels. Additionally or alternatively, in certain embodiments, extracting the signatures comprises determining background texture data associated with the background pixels. Additionally or alternatively, in certain embodiments, extracting the signatures comprises determining the distribution based at least in part on the foreground texture data and the background texture data.

In certain embodiments, extracting the respective distance to mean signatures comprises determining a Euclidean distance between the signatures.

In certain embodiments, extracting the respective distance to mean signatures comprises determining a signature for the distribution for the background pixels and the foreground pixels. Additionally or alternatively, in certain embodiments, extracting the respective distance to mean signatures comprises determining a mean signature for the background pixels and foreground pixels. Additionally or alternatively, in certain embodiments, extracting the respective distance to mean signatures comprises determining a distance between the signature and the mean signature.

In certain embodiments, segmenting the SEM image comprises performing an optimization process of the filter sizes and the respective distance to mean signatures to determine an optimal cutoff frequency value for a low-pass filter. Additionally or alternatively, in certain embodiments, segmenting the SEM image comprises segmenting the SEM image based at least in part on the optimal cutoff frequency value for the low-pass filter to generate the segmented image for the IC.

In certain embodiments, the segmenting the SEM image comprises calculating a confidence measure for respective pixels of the SEM image. Additionally or alternatively, in certain embodiments, the segmenting the SEM image comprises populating a data matrix with the confidence measure for the respective pixels. Additionally or alternatively, in certain embodiments, the segmenting the SEM image comprises combining the data matrix with a filtered version of the SEM image to generate the segmented image for the IC.

In another embodiment, an apparatus for segmenting an SEM image of an IC is provided. The apparatus comprises at least one processor and at least one memory including program code. The at least one memory and the program code is configured to, with the at least one processor, cause the apparatus to at least receive an SEM image for an IC, perform filtering and binarization of the SEM image, extract information associated with filter sizes for the filtering, extract signatures associated with a distribution for background pixels and foreground pixels of the SEM image, extract respective distance to mean signatures for the background pixels and the foreground pixels, and/or segment the SEM image based at least in part on the filter sizes and the respective distance to mean signatures to generate a segmented image for the IC.

In certain embodiments, the at least one memory and the program code are configured to, with the at least one processor, further cause the apparatus to at least split the SEM image into at least a first sub-image portion of the SEM image and a second sub-image portion of the SEM image based at least in part on a number of threads available to the at least one processor.

In certain embodiments, the at least one memory and the program code are configured to, with the at least one processor, further cause the apparatus to at least filter the SEM image based at least in part on a first low-pass filter associated with a first cutoff frequency value to generate a first filtered SEM image, filter the first filtered SEM image based at least in part on a second low-pass filter associated with a second cutoff frequency value to generate a second filtered SEM image, and/or determine an absolute sum of a difference in pixel intensity between the first filtered SEM image and the second filtered SEM image.

In certain embodiments, the at least one memory and the program code are configured to, with the at least one processor, further cause the apparatus to at least filter the SEM image based at least in part on a low-pass filter to generate a filtered SEM image, and/or apply the filtered SEM image to a Gaussian Mixture Model configured to generate a binarized SEM image.

In certain embodiments, the at least one memory and the program code are configured to, with the at least one processor, further cause the apparatus to at least extract the one or more signatures from the binarized SEM image.

In certain embodiments, the at least one memory and the program code are configured to, with the at least one processor, further cause the apparatus to at least perform an optimization process of the filter sizes and the respective distance to mean signatures to determine an optimal cutoff frequency value for a low-pass filter, and/or segment the SEM image based at least in part on the optimal cutoff frequency value for the low-pass filter to generate the segmented image for the IC.

In yet another embodiment, a non-transitory computer storage medium comprising instructions for segmenting a SEM image of an IC is provided. The instructions are configured to cause one or more processors to at least perform operations configured to receive an SEM image for an IC, perform filtering and binarization of the SEM image, extract information associated with filter sizes for the filtering, extract signatures associated with a distribution for background pixels and foreground pixels of the SEM image, extract respective distance to mean signatures for the background pixels and the foreground pixels, and/or segment the SEM image based at least in part on the filter sizes and the respective distance to mean signatures to generate a segmented image for the IC.

In certain embodiments, the instructions are further configured to split the SEM image into at least a first sub-image portion of the SEM image and a second sub-image portion of the SEM image based at least in part on a number of threads available to the one or more processors.

In certain embodiments, the instructions are further configured to filter the SEM image based at least in part on a first low-pass filter associated with a first cutoff frequency value to generate a first filtered SEM image, filter the first filtered SEM image based at least in part on a second low-pass filter associated with a second cutoff frequency value to generate a second filtered SEM image, and/or determine an absolute sum of a difference in pixel intensity between the first filtered SEM image and the second filtered SEM image.

In certain embodiments, the instructions are further configured to filter the SEM image based at least in part on a low-pass filter to generate a filtered SEM image, and/or apply the filtered SEM image to a Gaussian Mixture Model configured to generate a binarized SEM image.

In certain embodiments, the instructions are further configured to extract the one or more signatures from the binarized SEM image.

In certain embodiments, the instructions are further configured to perform an optimization process of the filter sizes and the respective distance to mean signatures to determine an optimal cutoff frequency value for a low-pass filter, and/or segment the SEM image based at least in part on the optimal cutoff frequency value for the low-pass filter to generate the segmented image for the IC.

The above summary is provided merely for purposes of summarizing some example embodiments to provide a basic understanding of some aspects of the present invention. Accordingly, it will be appreciated that the above-described embodiments are merely examples and should not be construed to narrow the scope or spirit of the present invention in any way. It will be appreciated that the scope of the present invention encompasses many potential embodiments in addition to those here summarized, some of which will be further described below.

BRIEF DESCRIPTION OF THE DRAWINGS

Reference will now be made to the accompanying drawings, which are not necessarily drawn to scale, and wherein:

FIG. 3 illustrates an algorithm that provides filtering and binarizing of an SEM image, according to various embodiments of the present disclosure;

FIG. 5 illustrates an algorithm that provides extraction of signatures, according to various embodiments of the present disclosure;

COMPUTER PROGRAM PRODUCTS, METHODS, AND COMPUTING ENTITIES

Figure 1:
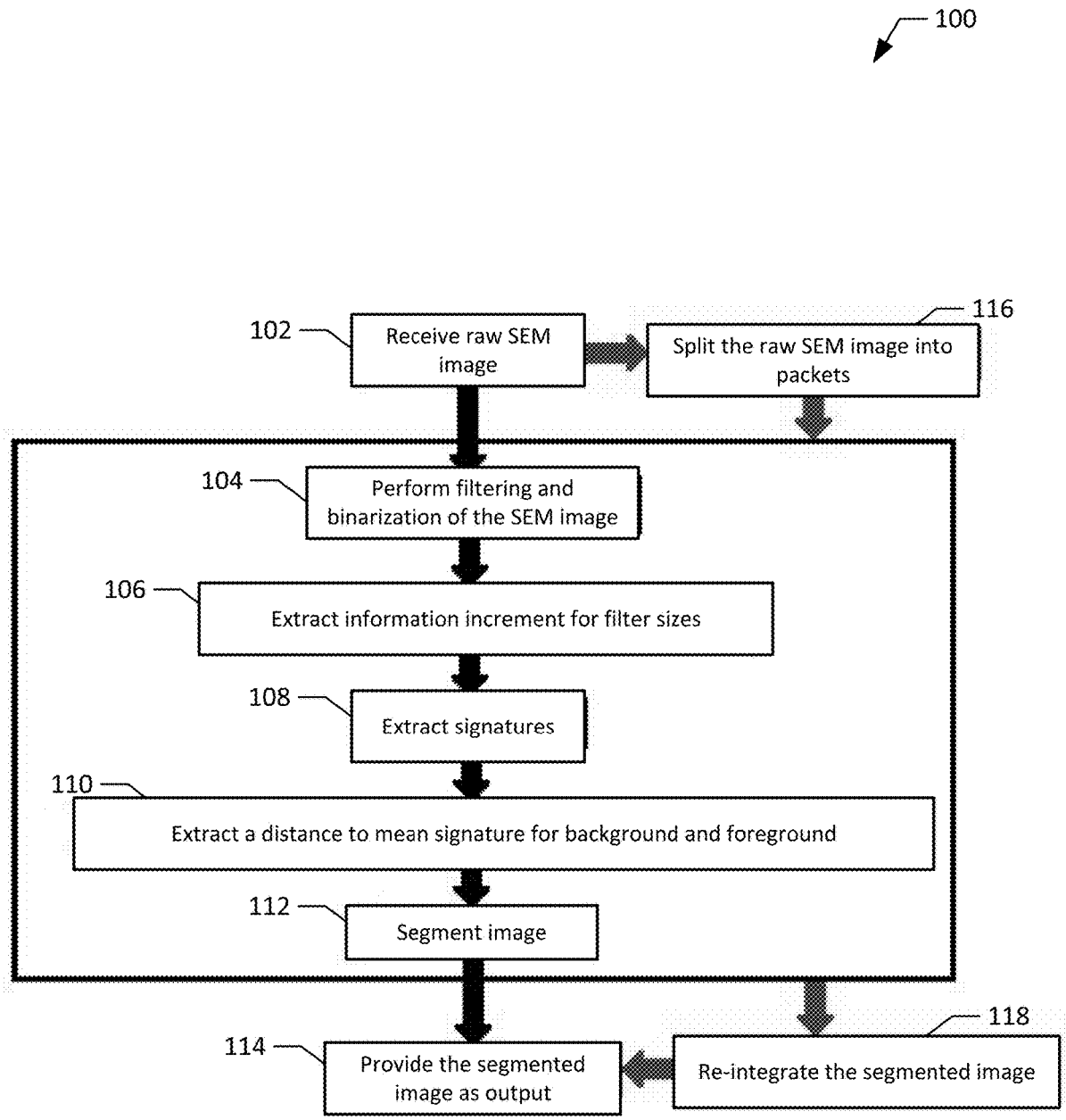
FIG. 1 provides a method for image processing for segmentation of Scanning Electron Microscopy (SEM) images, according to various embodiments of the present disclosure.

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps. The instructions, operations, and/or steps can be carried out by apparatus, systems, computing devices, computing entities, and/or the like.

Such apparatus, systems, computing devices, computing entities, and/or the like can be adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the apparatus, systems, computing devices, computing entities, and/or the like may also include one or more communications interfaces for communicating with various computing entities, such as by communicating data, content, information, and/or similar terms used herein interchangeably that can be transmitted, received, operated on, processed, displayed, stored, and/or the like.

In one embodiment, the apparatus, systems, computing devices, computing entities, and/or the like may include or be in communication with one or more processing elements (also referred to as processors, processing circuitry, processing device, and/or similar terms used herein interchangeably) that communicate with other elements within the apparatus, systems, computing devices, computing entities, and/or the like via a bus, for example. As will be understood, the processing element may be embodied in a number of different ways. For example, the processing element may be embodied as one or more complex programmable logic devices (CPLDs), "cloud" processors, microprocessors, multi-core processors, coprocessing entities, application-specific instruction-set processors (ASIPs), microcontrollers, and/or controllers. Further, the processing element may be embodied as one or more other processing devices or circuitry. The term circuitry may refer to an entirely hardware embodiment or a combination of hardware and computer program products. Thus, the processing element may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element may be configured for a particular use or configured to execute instructions stored in volatile or non-volatile media or otherwise accessible to the processing element. As such, whether configured by hardware or computer program products, or by a combination thereof, the processing element may be capable of performing steps or operations according to embodiments of the present invention when configured accordingly.

In one embodiment, the apparatus, systems, computing devices, computing entities, and/or the like may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the apparatus, systems, computing devices, computing entities, and/or the like may further include or be in communication with volatile media (also referred to as volatile storage, memory, memory storage, memory circuitry and/or similar terms used herein interchangeably). In one embodiment, the volatile storage or memory may also include one or more volatile storage or memory media, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element. Thus, the databases, database instances, database management systems, data, applications, programs, program modules, scripts, source code, object code, byte code, compiled code, interpreted code, machine code, executable instructions, and/or the like may be used to control certain aspects of the operation of the apparatus, systems, computing devices, computing entities, and/or the like with the assistance of the processing element and operating system.

As indicated, in one embodiment, the apparatus, systems, computing devices, computing entities, and/or the like may also include one or more communications interfaces for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the apparatus, systems, computing devices, computing entities, and/or the like may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the apparatus, systems, computing devices, computing entities, and/or the like may include or be in communication with one or more input elements, such as a keyboard input, a mouse input, a touch screen/display input, motion input, movement input, audio input, pointing device input, joystick input, keypad input, and/or the like. The apparatus, systems, computing devices, computing entities, and/or the like may also include or be in communication with one or more output elements (not shown), such as audio output, video output, screen/display output, motion output, movement output, and/or the like.

As will be appreciated, one or more components may be located remotely from other apparatus, systems, computing devices, computing entities, and/or the like components, such as in a distributed system. Furthermore, one or more of the components may be combined and additional components performing functions described herein may be included in the apparatus, systems, computing devices, computing entities, and/or the like. Thus, the apparatus, systems, computing devices, computing entities, and/or the like can be adapted to accommodate a variety of needs and circumstances. As will be recognized, these architectures and descriptions are provided for exemplary purposes only and are not limiting to the various embodiments.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Reverse engineering involves understanding constituent components from a final product. For example, reverse engineering is essentially an engineering work-flow for a final product that is performed in reverse. This engineering technique has been applied for a variety of technologies, including integrated circuits. As intuition suggests, the higher the complexity of a final product (e.g., an integrated circuit final product), the higher the hardships involved in reverse engineering the final product. This is especially true with integrated circuits with several billion transistors and/or interconnections occupying a very small area on a silicon wafer. In various implementations, reverse engineering can be employed to provide a better understanding of a structure of a final product and/or to provide a better understanding of an effect of a process to manufacture the final product. For instance, reverse engineering can be employed to analyze and/or debug an integrated circuit. Currently, reverse engineering of an integrated circuit is performed using human effort. For example, detailed optical images of an integrated circuit can be captured and components of the integrated circuit in the optical images can be marked by hand. However, human analysis of optical images is inefficient and labor intensive. Furthermore, capturing detailed optical images of an integrated circuit generally involves long hours of imaging for an integrated circuit. Therefore, there is a need for faster, more efficient, and/or more cost-effective reverse engineering techniques for integrated circuits.

Scanning Electron Microscopy (SEM) is an imaging technique for semiconductor technologies. For example, SEM is often employed for failure analysis of integrated circuits. In addition, with the recent growth of physical attacks on electronics with malicious intent, SEMs are becoming increasingly desirable for hardware assurance. For example, SEMs are becoming increasingly desirable for reverse engineering of integrated circuits. However, as discussed above, reverse engineering of integrated circuits generally involves long hours of imaging for an integrated circuit. For example, an estimated time of imaging for reverse engineering of an integrated circuit of size 1.5 mm×1.5 mm employing a 130 nm node technology is approximately 30 days. Therefore, with the ongoing trend of adding more structures onto a limited space on an integrated circuit, the imaging time frame for reverse engineering of an integrated circuit is becoming increasingly inefficient.

SEM images are produced by accelerating electrons toward a region of interest and obtaining the scattered electrons from their interactions with the target materials. There are two main types of interactions: Secondary Electrons (SE) and Back Scattered Electrons (BSE). The imaging quality from these two interactions depend on the constituent materials in the IC chip being imaged and a number of parameters. There are several imaging parameters in SEM that can be tuned to optimize for image quality and/or imaging timeframe. For example, dwelling time is an imaging parameter in SEM that can be tuned. However, optimizing dwelling time per pixel can reduce image quality in certain implementations due to, for example, noise introduced in the image. For example, an image acquired with low dwelling time would generally result in low image quality. Hence, an unsupervised model-free approach is desirable to compensate for the lack of image quality. In particular, it is desirable to extract data by segmenting an image associated with an integrated circuit to reduce an overall imaging timeframe.

An example of segmentation of SEM images for reverse engineering and/or hardware assurance is thresholding based binarization with spatial filtering. Another example of segmentation of SEM images for reverse engineering and/or hardware assurance employs machine learning techniques. However, due to the complexity of the relationship between distortions introduced by imaging at lower settings and higher settings for dwelling time, a learning algorithm is preferable. For example, a dictionary of learned features can be employed to suppress noise and provide high quality image reconstruction from low quality images. However, the learned features are generally selected from image patches by a user. Furthermore, type of features and/or size of features are generally drastically different at various layers of an integrated circuit. Therefore, it is generally inefficient to determine a set of learned features.

To address these and/or other issues, various embodiments described herein relate to a novel image processing algorithm for segmentation of SEM images. According to various embodiments, accelerated segmentation for reverse engineering of integrated circuits (e.g., large-scale accelerated segmentation for reverse engineering of integrated circuits) is provided. According to various embodiments, transform-based image processing can be provided to extract textures from various layers of an integrated circuit. Furthermore, according to various embodiments, the various layers can be segmented based on the textures. As discussed above, SEM is an imaging technique that can be employed for reverse engineering and/or hardware assurance for integrated circuits. One parameter in SEM imaging is the dwelling time required per pixel. Since the dwelling time parameter correlates positively with both imaging time and quality, there it is desirable to employ an image processing algorithm that can employ low dwelling time images while also providing desirable image quality for a segmented version of the image. According to various embodiments, the image processing algorithm disclosed herein employs texture-based curve evolution to provide low dwelling time images with improved image quality.

According to various embodiments, the image processing algorithm disclosed herein employs unsupervised learning and is implemented without a model. As such, the image processing algorithm disclosed herein can be applied to various layers of an integrated circuit without modification and/or fine tuning of the image processing algorithm. Furthermore, according to various embodiments, the image processing algorithm disclosed herein supports and/or implements parallel processing. As such, processing speed of the image processing can be improved by employing processors that support parallel processing. Additionally, with the image processing algorithm disclosed herein, knowledge obtained from an image can be extended to one or more other images from the same layer in the integrated circuit, thereby providing faster and/or more efficient processing of images. Additionally, according to various embodiments, the image processing algorithm disclosed herein is more effective on images obtained at lower dwelling times than higher dwelling times.

A. EXEMPLARY METHOD FOR IMAGE PROCESSING

In various embodiments, a method 100 for image processing is employed. The method 100 shown in FIG. 1 illustrates an embodiment for providing image processing for segmentation of SEM images. For instance, starting at block 102, a raw SEM image is received. In an embodiment, the raw SEM image is generated by an SEM system (e.g., SEM system 1500 shown in FIG. 15). In one or more embodiments, the raw SEM image is acquired at a low magnification (e.g., a magnification of 200 µm) by the SEM system. For example, in one or more embodiments, the raw SEM image is employed to localize density of objects found in an integrated circuit (e.g., a structure of the integrated circuit) for further fine-tuning.

At block 104, filtering and binarization of the SEM image is performed. According to various embodiments, one or more frequency domain techniques are employed to suppress high frequency components in the SEM image. In certain embodiments, a Fourier domain is employed to suppress high frequency components in the SEM image. Additionally or alternatively, in certain embodiments, wavelets are employed to suppress high frequency components in the SEM image. However, it is to be appreciated that, in certain embodiments, another type of frequency domain technique can additionally or alternatively be employed to suppress high frequency components in the SEM image. According to various embodiments, a set of low-pass filters can be employed to suppress specific range of frequencies starting from the base frequency to the highest possible frequency. For instance, according to various embodiments, each low-pass filter from the set of low-pass filters can incrementally suppress one higher frequency than the previous frequency, resulting in incremental smoothing of the image. In one or more embodiments, each low-pass filter from the set of low-pass filters can include a different cut-off frequency to facilitate incrementally suppressing one higher frequency than a previous frequency for a previous low-pass filter. Binarization involves transforming the raw SEM image into a binary image (e.g., a binarized SEM image). Accordingly, the binarization process in various embodiments transforms respective pixel values in the raw SEM image into either "1" or "0" while still maintaining ae basic structure and/or contrast of the raw SEM image. In one or more embodiments, one or more binarization algorithms such as Otsu's method or another binarization algorithm tailored to a specific application can be employed to transform the raw SEM image into a binary image (e.g., a binarized SEM image). In one or more embodiments, the raw SEM image can be filtered based at least in part on one or more low-pass filters to generate one or more filtered SEM images. Furthermore, in one or more embodiments, the one or more filtered SEM images can be applied to a Gaussian Mixture Model (GMM) configured to generate one or more binarized SEM images.

Figure 2:
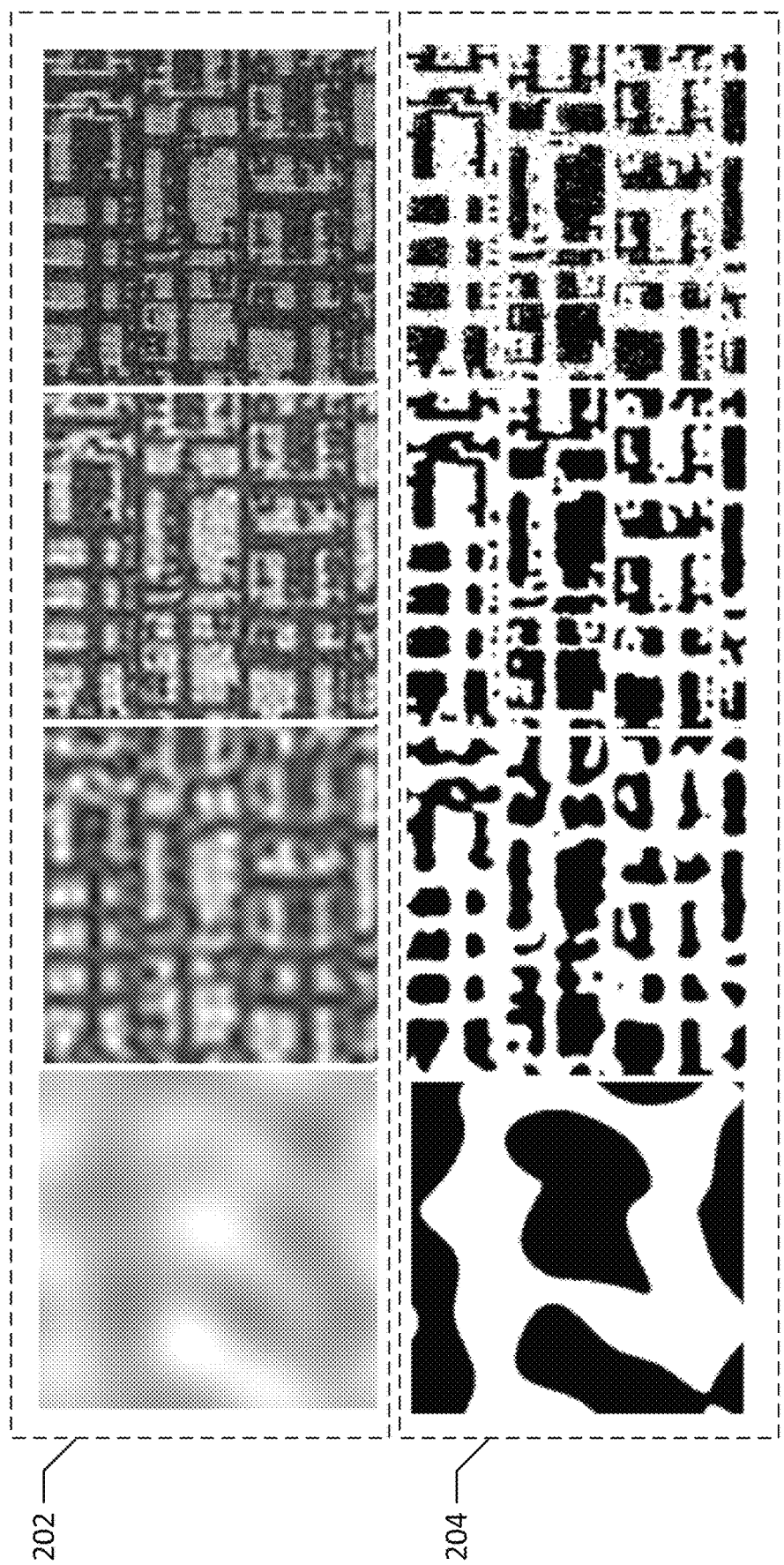
FIG. 2 illustrates filtered images and binarized images, according to various embodiments of the present disclosure.

FIG. 2 illustrates the filtering and binarization of the SEM image. For example, a set of images 202 in FIG. 2 illustrates filtering and incremental smoothing of the SEM image. After applying a low-pass filter from the set of low-pass filters on the SEM image, a 2-component GMM can be trained on the SEM image with components being the foreground and the background. As such, a grayscale image version of the SEM image can be converted into a binarized image. For example, a set of images 204 in FIG. 2 illustrates the binarized images. In one or more embodiments, a number of distributions in the GMM can be determined by a level of density. For example, a two-level quantization may be applied to an active region and a metal layer of an integrated circuit sample. The mean of the distribution can be obtained from the GMM and persistence can be classified as high or low density based at least in part on proximity to either distribution. In an example, a lower mean can correspond to a higher density and a higher mean can correspond to a lower density. FIG. 3 illustrates an algorithm 300 that provides filtering and binarizing of the SEM image, according to various embodiments of the present disclosure with respect to block 104. In certain embodiments, a filter size for the filtering can be determined based on a number of rows in the raw SEM image. In certain embodiments, a low-pass filter for the filtering provides a filtered image based on the SEM image and a filter size for the low-pass filter.

At block 106, information increment for filter sizes is extracted. According to various embodiments, the information increment can be defined as an absolute sum of a difference in pixel intensity between two consecutive filtered images associated with the filtering and/or binarization of the SEM image (e.g., two consecutive filtered images associated with the block 104). According to various embodiments, the information increment can be extracted for filter sizes to quantify an amount of information provided by the additional frequency component since, for example, high frequency components do not change the pixel intensity values by a large margin. According to various embodiments, most of the information can be captured by the low frequency components and one or more higher frequency components can be limited to reduce noise. In an embodiment, the information increment can be described by the following equation:

$$InformationIncrement_{i,i+1} = \sum_{m=1}^{r}\sum_{n=1}^{c}|FilteredImage_i(m,n) - FilteredImage_{i+1}(m,n)|$$

where "r" corresponds to row dimensions of the SEM image, "c" corresponds to column dimensions of the SEM image, and "i" represents a low-pass filter size (e.g., a low-pass filter size for a low-pass filter employed by the filtering in block 104).

Figure 4:
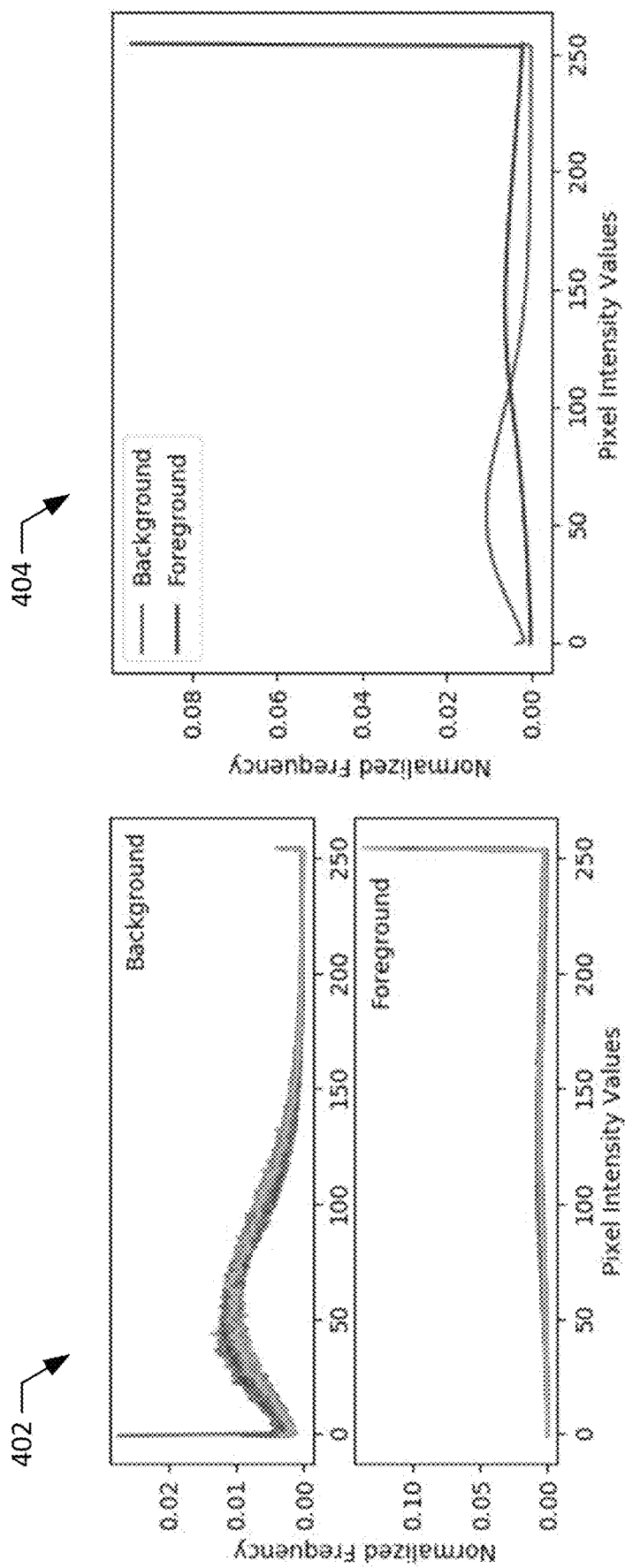
FIG. 4 illustrates distributions of signatures, according to various embodiments of the present disclosure.

At block 108, signatures are extracted. The binarized image provided by the binarization associated with block 104 represents both the foreground and background. In one or more embodiments, the background can correspond to a substrate (e.g., a silicon substrate, etc.) of the integrated circuit and the foreground can correspond to one or more other materials (e.g., one or more other layers, one or more other objects, one or more other components, etc.) of the integrated circuit. According to various embodiments, the binarized image can provide a foreground mask and a background mask that can be multiplied with the original SEM image. As a result, a distribution for the background pixels and foreground pixels can be provided, as shown in graph 402 of FIG. 4. For example, the graph 402 illustrates distributions of the individual signatures for the low-pass filtered images. According to various embodiments, the distributions obtained for the foreground and background from all the binarized masks provided by the binarization associated with block 104 can be averaged out. With noise being random and a majority of the foreground and background being captured by the masks, the distributions obtained can correspond to a signature for the texture introduced by the noise to the foreground and background. As such, according to various embodiments, the signatures can be extracted from the masks. According to various embodiments, the foreground can be a foreground texture associated with corresponding foreground pixels and the background can be a background texture associated with corresponding background pixels. According to various embodiments, the binarized images obtained at block 104 can be employed as masks for the foreground and/or background. According to various embodiments, a mask can be multiplied with the raw SEM image received at block 102 to extract a distribution histogram (e.g., an intensity distribution) for the foreground and/or a distribution histogram (e.g., an intensity distribution) for the background. According to various embodiments, the foreground and background intensity distributions obtained from the binarized masks can be averaged to provide a mean signature for the background and/or a mean signature for the foreground. Mean signatures for the foreground and background are shown in graph 404 of FIG. 4. For example, the graph 404 illustrates distributions for the mean signatures. FIG. 5 illustrates an algorithm 500 that provides extraction of signatures, according to various embodiments of the present disclosure with respect to block 108. In certain embodiments, the background intensity distribution can be obtained using an element wise multiply function associated with the binarized image and the SEM image. In certain embodiments, the foreground intensity distribution can be obtained using an element wise multiply function associated with an inverted binarized image and the SEM image.

At block 110, a distance to mean signature for background and foreground is extracted. According to various embodiments, texture of materials can be employed to determine bounding regions. For example, according to various embodiments, a representation for texture for the foreground and a representation for texture for background can be extracted. Additionally, according to various embodiments, one or more distance calculation techniques can be employed to determine one or more distances between the mean background and background distribution. The one or more calculated distances can also be stored to facilitate further image processing. According to various embodiments, a Euclidean distance between the mean background and background distribution can be determined and stored. However, it is to be appreciated that, in certain embodiments, another type of distance calculation can be employed to determine distance between the mean background and background distribution. Furthermore, according to various embodiments, a Euclidean distance between the mean foreground and foreground distribution can be determined and stored. However, it is to be appreciated that, in certain embodiments, another type of distance calculation can be employed to determine distance between the mean foreground and foreground distribution. According to various embodiments, the distance (e.g., the Euclidean distance, etc.) between every individual signature computed using the masks at each frequency step to the mean signature is calculated. According to various embodiments, a filtered image having a shortest distance between corresponding distributions and mean distributions can optimally bound the structures in the SEM image.

At block 112, the image is segmented. According to various embodiments, segmentation of the image can include two phases. During a first phase of the segmentation of the image, according to various embodiments, an optimization can be performed on the information increment determined at block 106 and the distances determined at block 110. For example, according to various embodiments, a filter size "i" that provides the highest information increment along with the shortest distance (e.g., the shortest distance between the mean foreground and background signature to a corresponding distributions) can be selected. According to various embodiments, in order to determine an optimal filter value, the information increment and/or the distances can be normalized to a maximum value of one. Furthermore, the information increment and/or the distances can be summed together at the respective filter sizes. In an embodiment, an optimal filter value can be determined based on the following equation:

$$BestFilterSize = \min|InformationIncrement_{i-1,i} + \\ \|BgdDist_i - MeanBgdDist\|_2^2 + \|FgdDist_i - MeanFgdDist\|_2^2|$$

According to various embodiments, an optimal filter size can be a filter size that correspond to a least cost value. According to various embodiments, the filtered image and a corresponding binarized mask can preserve an optimal amount of information from a low-pass filtered version of the image. According to various embodiments, an optimal filter size can be a filter size that provides an optimal cut-off frequency. The optimization relies on two key factors from the previous steps. According to various embodiments, an optimal filter size can be determined based on proximity of a texture signature of a candidate cut-off frequency to a mean signature. Additionally or alternatively, according to various embodiments, a change in information between low-pass filters can correspond to the candidate cut-off frequency. According to various embodiments, a cost function that provides the minimum cut-off frequency can be minimized while maximizing a change in information and minimizing a distance to the mean texture signature.

With the image filtered, noise in the image can be suppressed. According to various embodiments, further optimization can be performed by smoothing edges in the image. For instance, according to various embodiments, a second phase of the segmentation of the image can recover high frequency information for the image. According to various embodiments, the high frequency information can be recovered based on a confidence measure for respective pixel values for the image. For instance, one or more binarized masks can be employed to predict the confidence measure. According to various embodiments, one or more binarized masks not related to the optimal filter size for the low-pass filter can be employed to predict the confidence measure. In an embodiment, for a pixel in the image, a confidence measure can correspond to a median of all the pixels at a given position in the binarized image that were discarded after calculating the optimal filter size. In certain embodiments, if the median value is equal to one, the pixel can be replaced with a 255 value. In certain embodiments, if the median value is not equal to one, the pixel can be replaced with zero. According to various embodiments, noise (e.g., random noise) can be removed by the median operator.

According to various embodiments, the binarized image from the optimal low-pass filtered image and the confidence value for each pixel can be combined. For example, according to various embodiments, the binarized image from the optimal low-pass filtered image and the confidence value for each pixel can be logically combined using an OR operation. A result of the binarized image from the optimal low-pass filtered image and the confidence value for each pixel being combined is a binarized segmented image. According to various embodiments, a confidence measure can be calculated for every pixel in the SEM image. Additionally, according to various embodiments, the confidence measure for every pixel can be populated into a matrix of same dimensions as the SEM image. For example, in various embodiments, all the binarized masks belonging to frequencies above the cut-off frequency can be employed. Furthermore, for any given location in the SEM image, the confidence value can correspond to the median of all high frequency binarized masks at the specific pixel location. According to various embodiments, the populated matrix containing the confidence values can be combined with the filtered image. For example, according to various embodiments, the populated matrix containing the confidence values can be combined with the filtered image using a logical OR operation.

Figure 6:
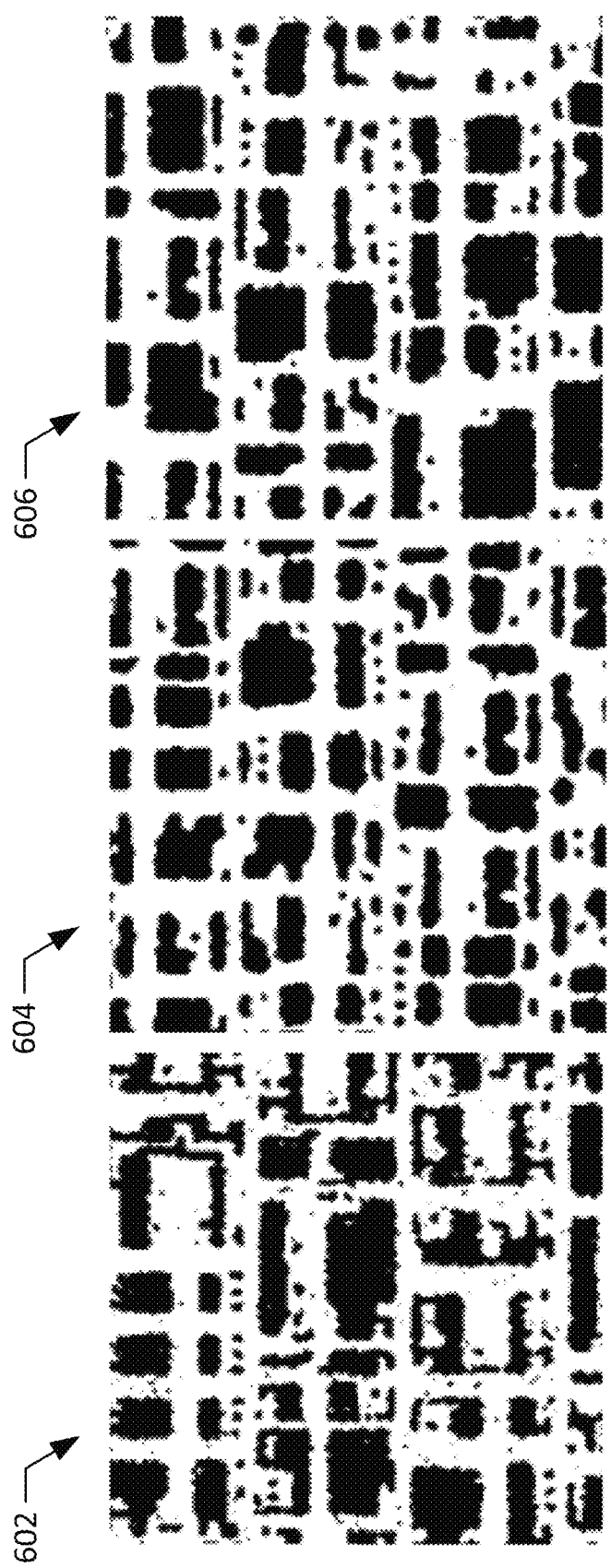
FIG. 6 illustrates segmented images, according to various embodiments of the present disclosure.

At block 114, the segmented image (e.g., the segmented SEM image) is provided as output. Some examples of segmented images are shown in FIG. 6. For example, FIG. 6 includes a first exemplary segmented image 602, a second exemplary segmented image 604, and a third exemplary segmented image 606.

Figure 7:
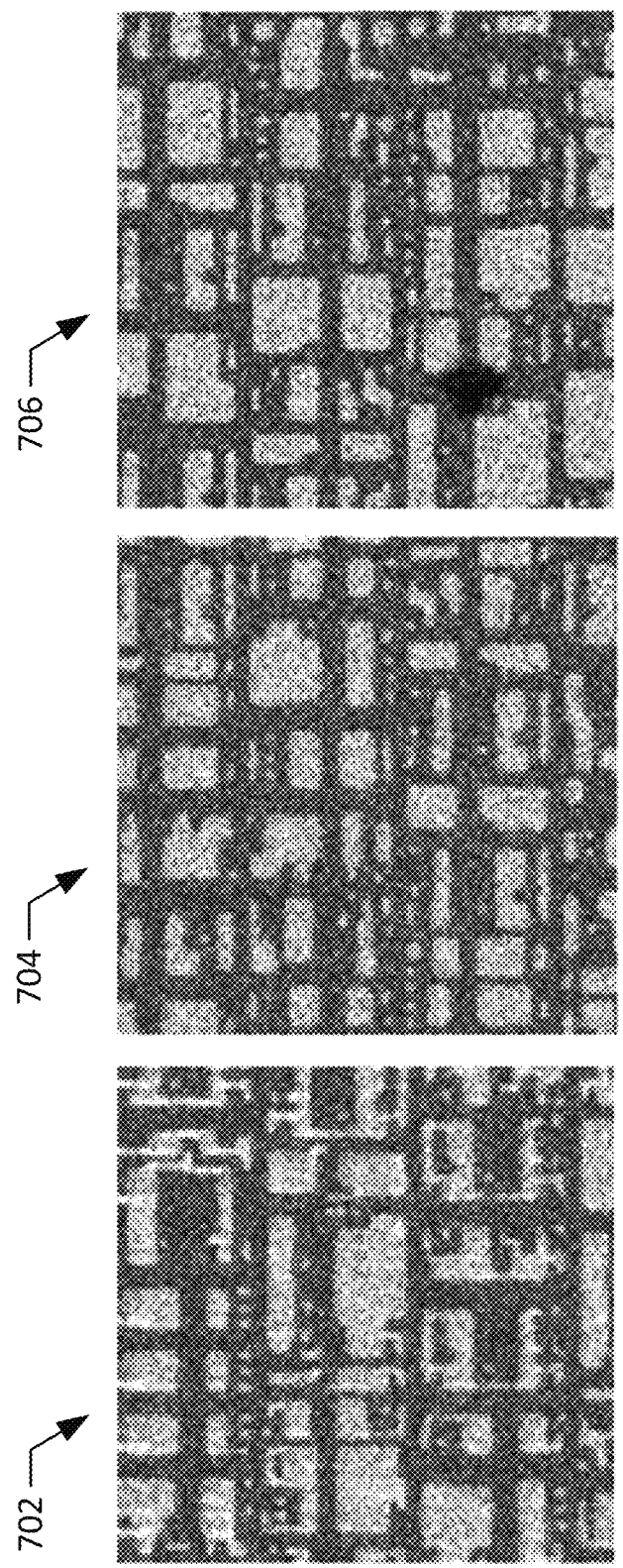
FIG. 7 illustrates a set of sub-image portions of an image, according to various embodiments of the present disclosure.
Figure 8:
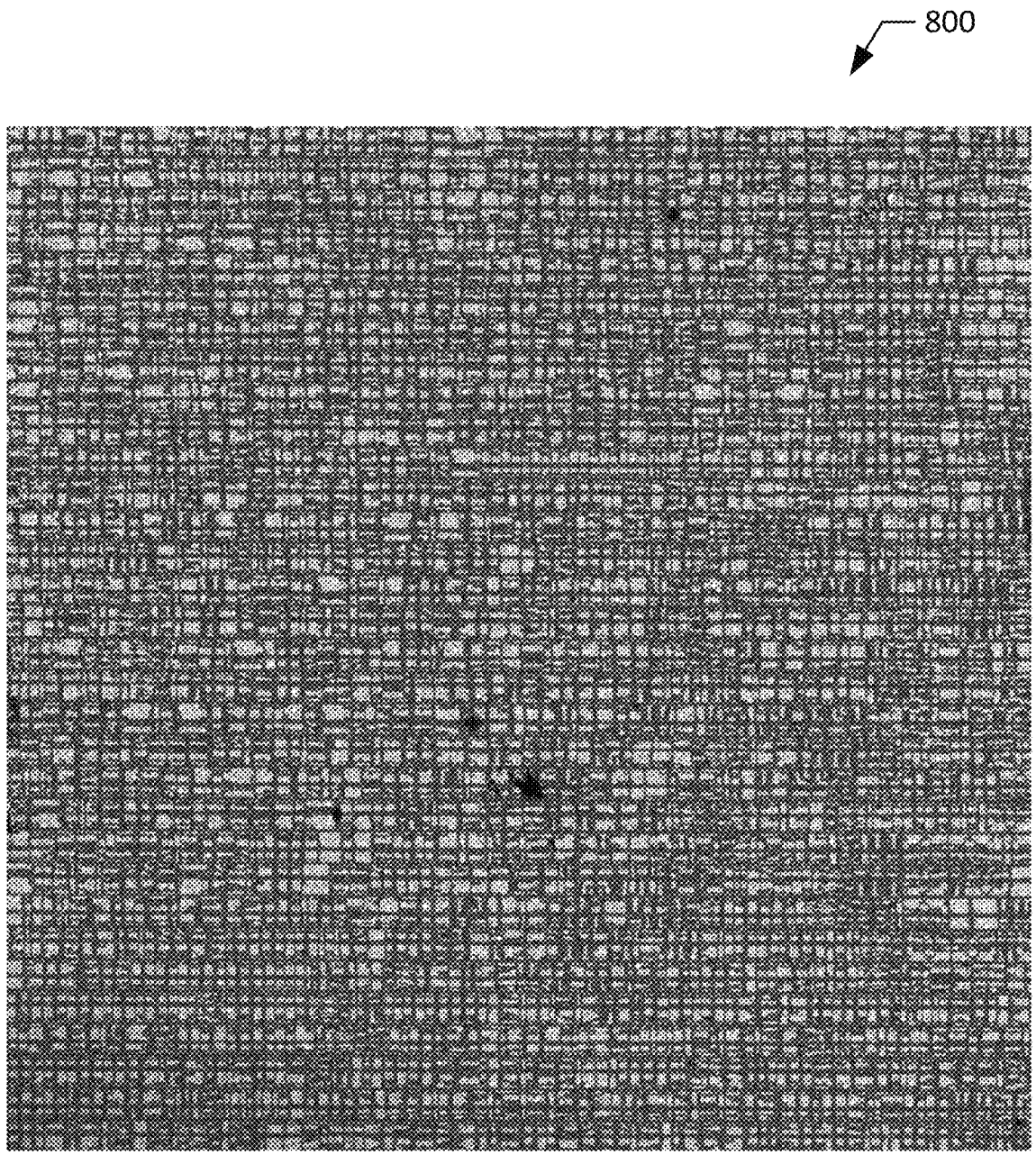
FIG. 8 illustrates a raw SEM image, according to various embodiments of the present disclosure.
Figure 9:
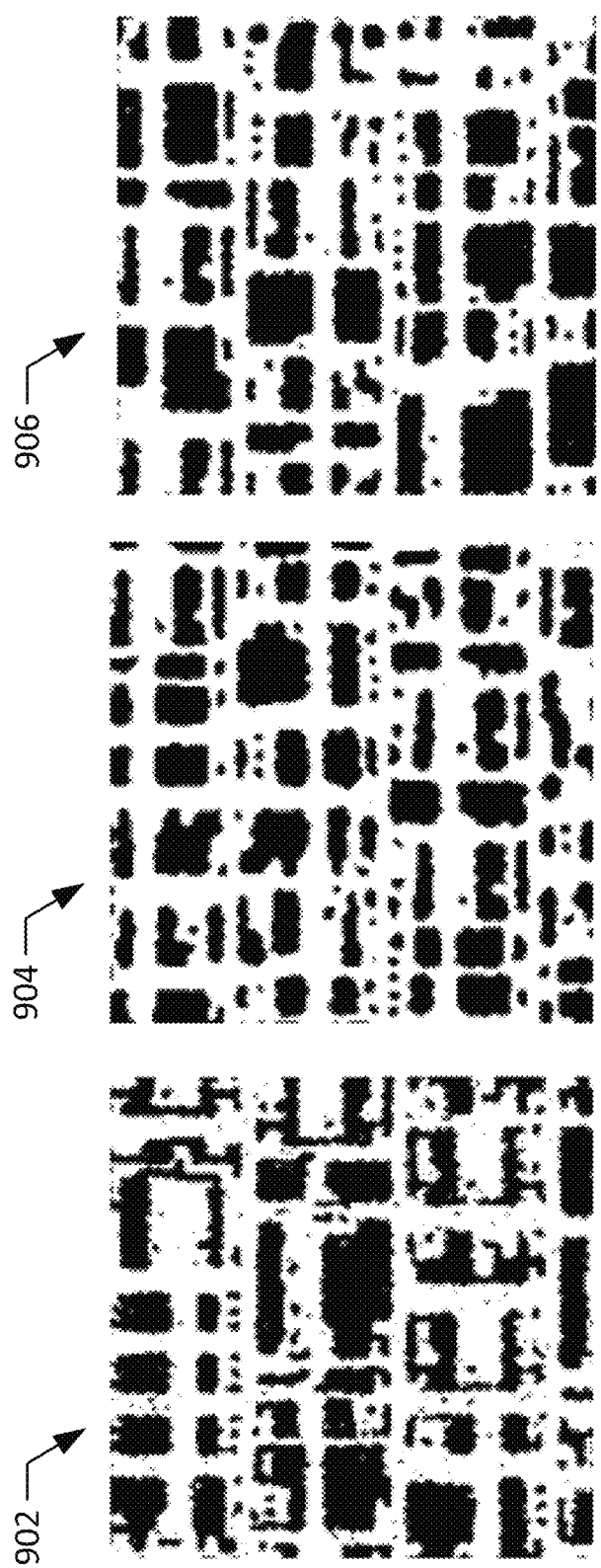
FIG. 9 illustrates a set of segmented sub-image portions, according to various embodiments of the present disclosure.

In certain embodiments, the method 100 additionally includes a block 116 for splitting the raw SEM image into packets. According to various embodiments, the block 116 can be performed after the block 102. Furthermore, according to various embodiments, the block 116 can be associated with parallel processing. According to various embodiments, the raw SEM image is split into sub-image portions and the sub-image portions are provided to the image processing in parallel. According to various embodiments, a number of sub-image portions can be determined based on a number of threads available to the processor. For example, in certain embodiments, a number of sub-image portions can correspond to a number of threads available to the processor. FIG. 7 illustrates a set of sub-image portions that can be provided to the image processing in parallel. For example, FIG. 7 includes a first sub-image portion 702, a second sub-image portion 704, and a third sub-image portion 706 that can be provided to the image processing in parallel. In an example embodiment, a raw SEM image 800 shown in FIG. 8 can be the image that is split into the first sub-image portion 702, the second sub-image portion 704, and the third sub-image portion 706. Furthermore, the raw SEM image 800 can correspond to the raw SEM image received at block 102, for example. In an example, the raw SEM image 800 can be acquired at a 3.2 μsec/pixel dwelling time and 200 μm magnification. According to various embodiments, a set of segmented sub-image portions can be provided. FIG. 9 illustrates a set of segmented sub-image portions that correspond to the set of sub-image portions. For example, FIG. 9 includes a first segmented sub-image portion 902 associated with the first sub-image portion 702, a second segmented sub-image portion 904 associated with the second sub-image portion 704, and a third segmented sub-image portion 906 associated with the third sub-image portion 706.

Figure 10:
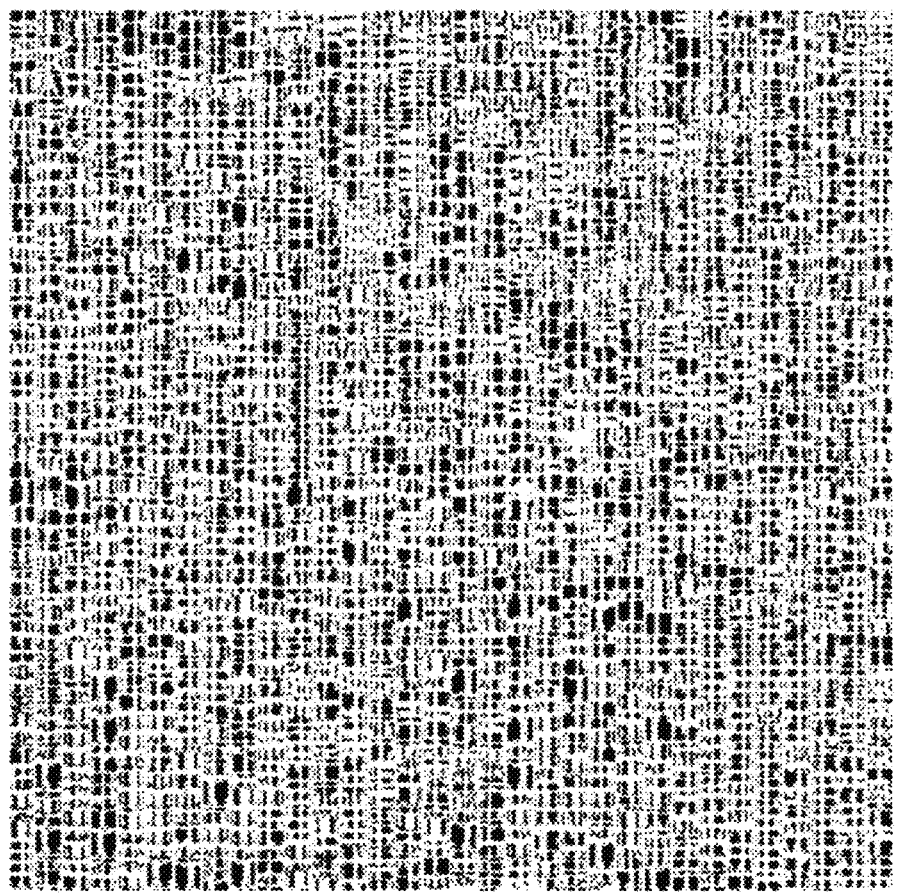
FIG. 10 illustrates a stitched segmented image, according to various embodiments of the present disclosure.

In certain embodiments, the method 100 additionally includes a block 118 for re-integrating the segmented image. According to various embodiments, the block 118 can provide the segmented image to the block 118. Furthermore, according to various embodiments, the block 118 can be associated with parallel processing. According to various embodiments, the sub-image portions are stitched back together into an original position. For example, the raw SEM image 800 can be segmented to form a stitched segmented image 1000 shown in FIG. 10.

B. EXEMPLARY RESULTS FOR THE IMAGE PROCESSING

Figure 11:
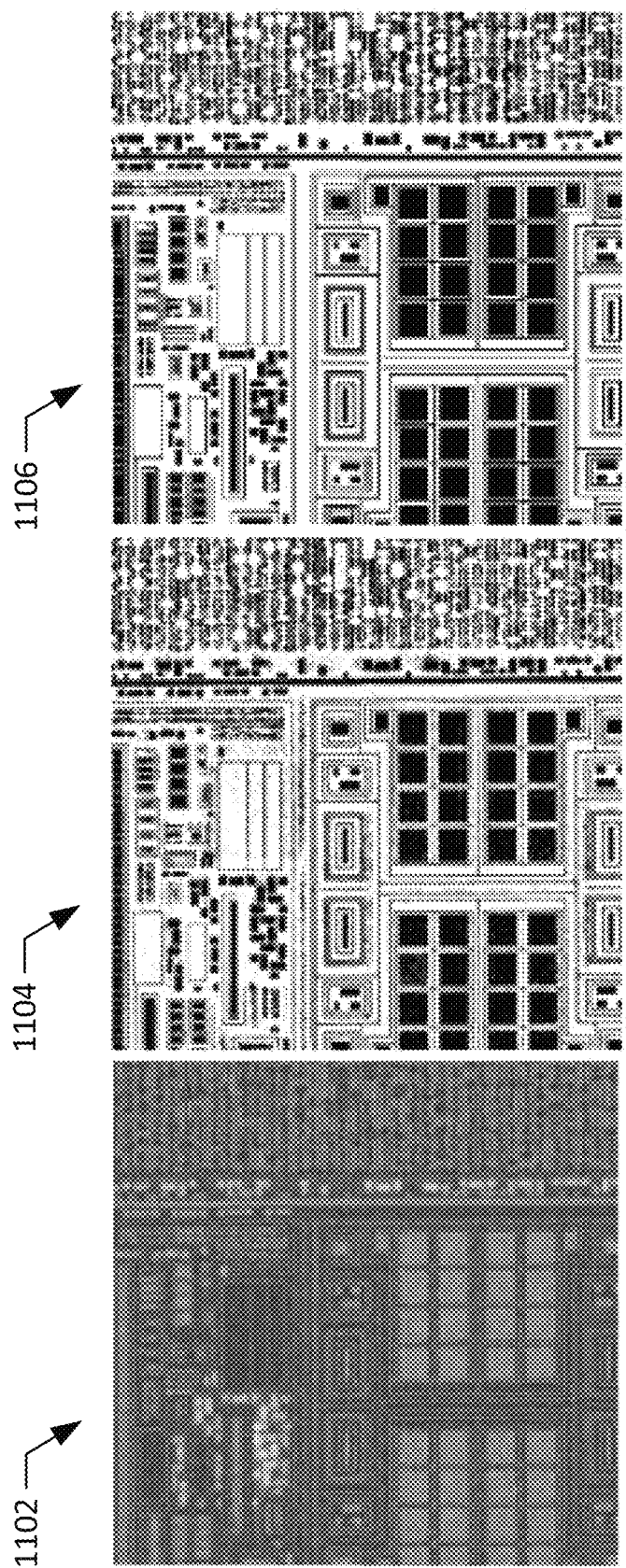
FIG. 11 illustrates segmentations associated with a doping layer of an integrated circuit, according to various embodiments of the present disclosure.
Figure 12:
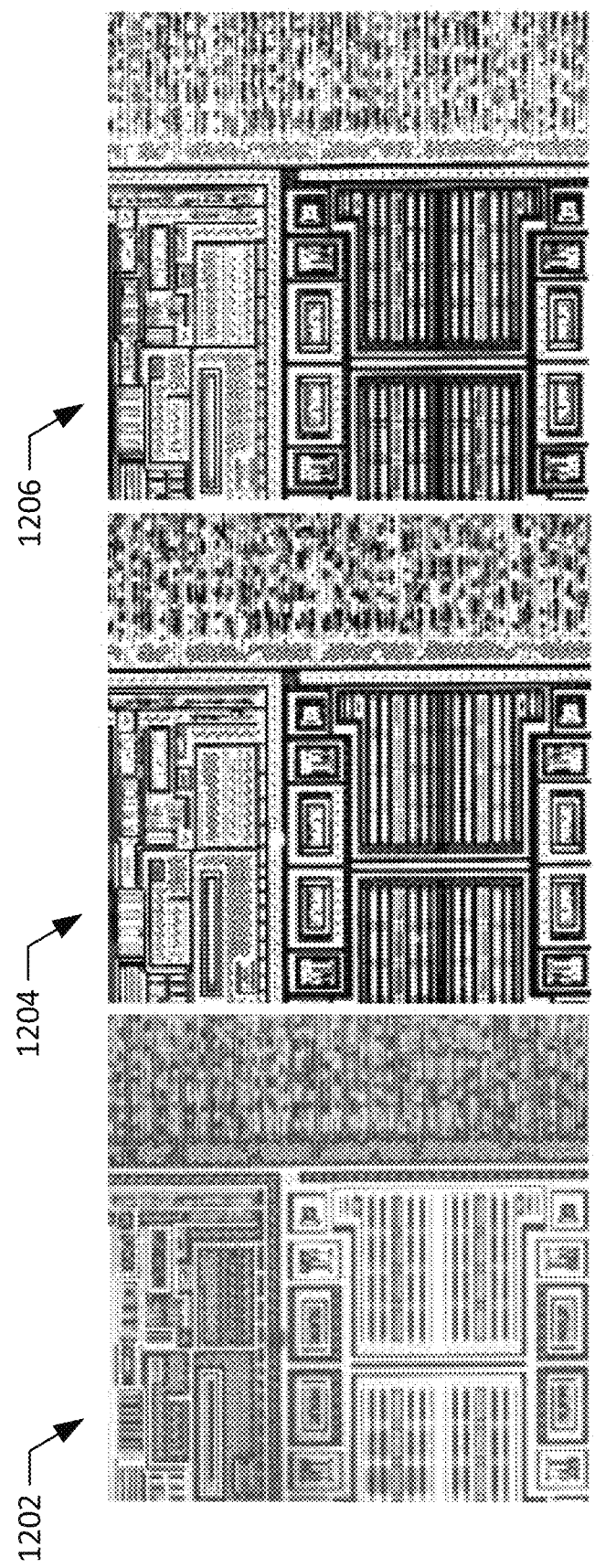
FIG. 12 illustrates segmentations associated with a metal layer of an integrated circuit, according to various embodiments of the present disclosure.
Figure 13:
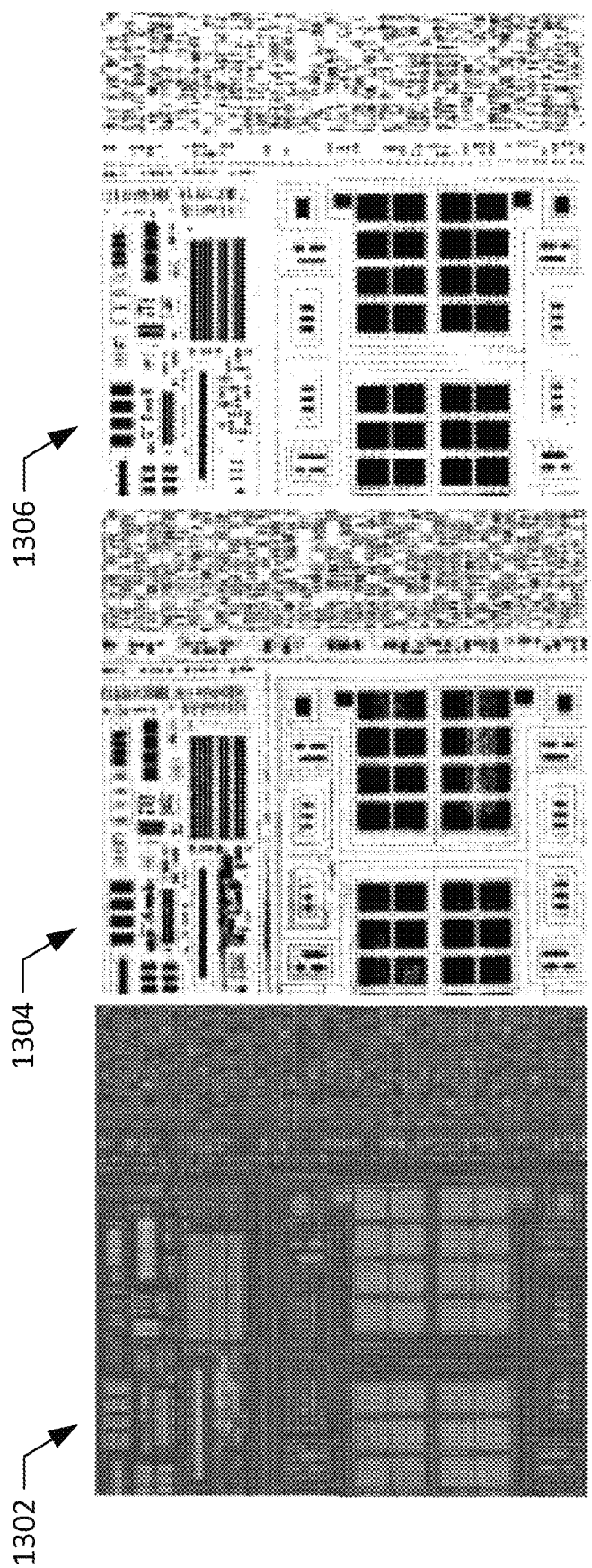
FIG. 13 illustrates segmentations associated with a polysilicon layer of an integrated circuit, according to various embodiments of the present disclosure.
Figure 14:
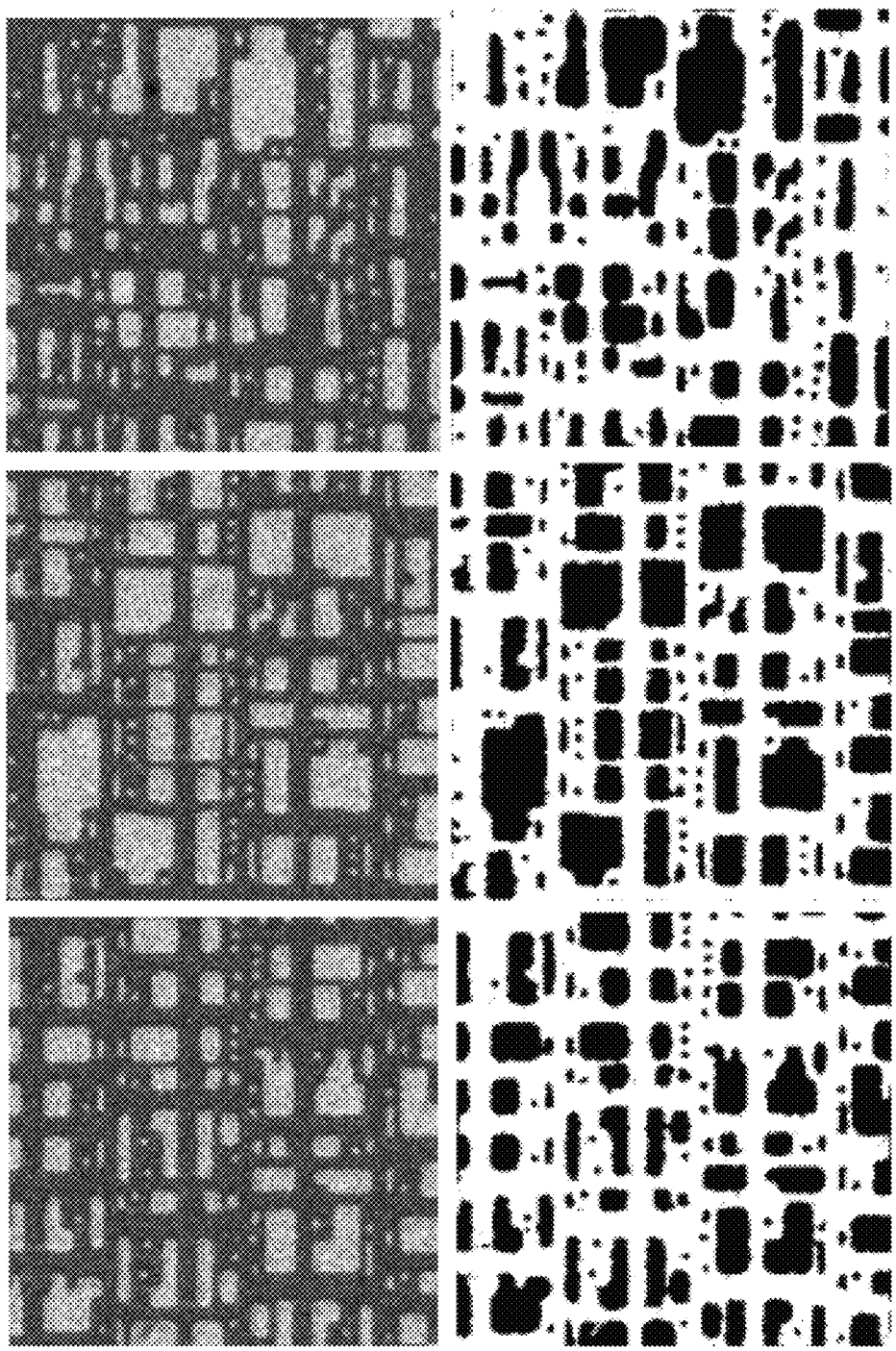
FIG. 14 illustrates sub-image portions from a raw SEM image, according to various embodiments of the present disclosure.

The image processing algorithm disclosed herein for segmentation of SEM images provides improved reverse engineering and/or improved hardware assurance results for various types of layers of an integrated circuit (e.g., a doping layer, a polysilicon layer, a metal layer, etc.). In an exemplary embodiment, the image processing algorithm disclosed herein can be evaluated with respect to a doping layer, metal layer, and a polysilicon layer of an integrated circuit using dwelling time parameter of 10 µs/pixel and a magnification of 200 µm. The resulting segmentations are given in FIG. 11, FIG. 12 and FIG. 13, respectively. For example, FIG. 11 illustrates the doping layer of the integrated circuit with an original SEM image 1102, a segmented image 1104, and a ground truth image 1106. FIG. 12 illustrates the metal layer of the integrated circuit with an original SEM image 1202, a segmented image 1204, and a ground truth image 1206. Furthermore, FIG. 13 illustrates the polysilicon layer of the integrated circuit with an original SEM image 1302, a segmented image 1304, and a ground truth image 1306. Furthermore, FIG. 14 illustrates sub-image portions from an image sample (e.g., a raw SEM image) acquired at 10 µs/pixel and a magnification of 200 µm from a doping layer of an integrated circuit. As it can be clearly observed from FIGS. 11-14, segmentation performed by the image processing algorithm disclosed herein is approximately equal to the true ground truth of the image.

C. EXEMPLARY SCANNING ELECTRON MICROSCOPY SYSTEM

Although various embodiments of the invention may be carried out with respect to different types of imaging modalities, the remaining disclosure it discussed with respect to using various embodiments in an SEM environment. An SEM environment is used to illustrate these embodiments and to help facilitate the reader's understanding of the embodiments. Thus, it should be understood that embodiments of the invention may be used along with other imaging modalities and the discussion of various embodiments involving an SEM environment does not limit the scope of the invention.

Figure 15:
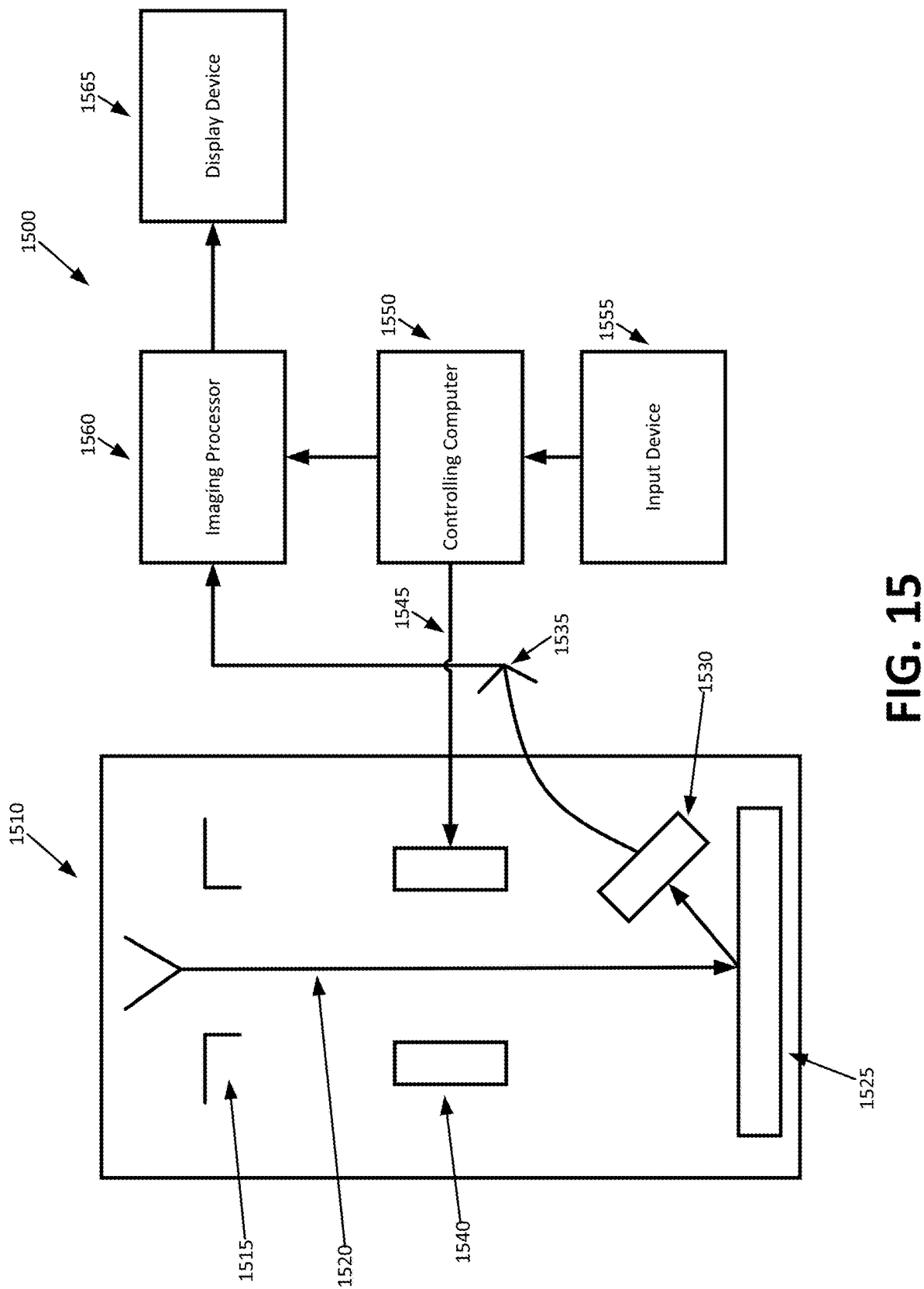
FIG. 15 is a schematic of a scanning electron microscope system that may be used in accordance with various embodiments of the present disclosure.

Turning now to FIG. 15, a schematic configuration of an SEM system 1500 that can be used in accordance with various embodiments of the present invention is provided. The body 1510 of the SEM microscope includes an electron gun 1515 through which an electron beam 1520 is emitted and converged by an electron lens (not shown) and irradiated on a sample 1525. An electron detector 1530 detects the intensity of secondary electrons generated from the surface of the sample 1525 or intensity of reflected electrons by electron beam irradiation. Accordingly, an amplifier 1535 amplifies the electron beam 1520 and a deflector 1540 deflects the beam 1520, subjecting the beam 1520 to raster scanning on the sample surface according to a control signal 1545 provided by a controlling computer 1550. Here, the control signal 1545 indicates parameters for performing the scanning of the sample 1525 such as, for example, the magnification that is to be used. One or more input devices 1555 such as a keyboard and/or a mouse may be connected to the controlling computer 1550. A signal outputted from the amplifier 1535 is converted from analog to digital inside an imaging processor 1560 to generate digital image data. Accordingly, a display device 1565 may be used to view the image data. Moreover, the imaging processor 1560 may include memory for storing the digital image data and may perform various imaging processes and display controls.

D. EXEMPLARY COMPUTING ENTITY

Figure 16:
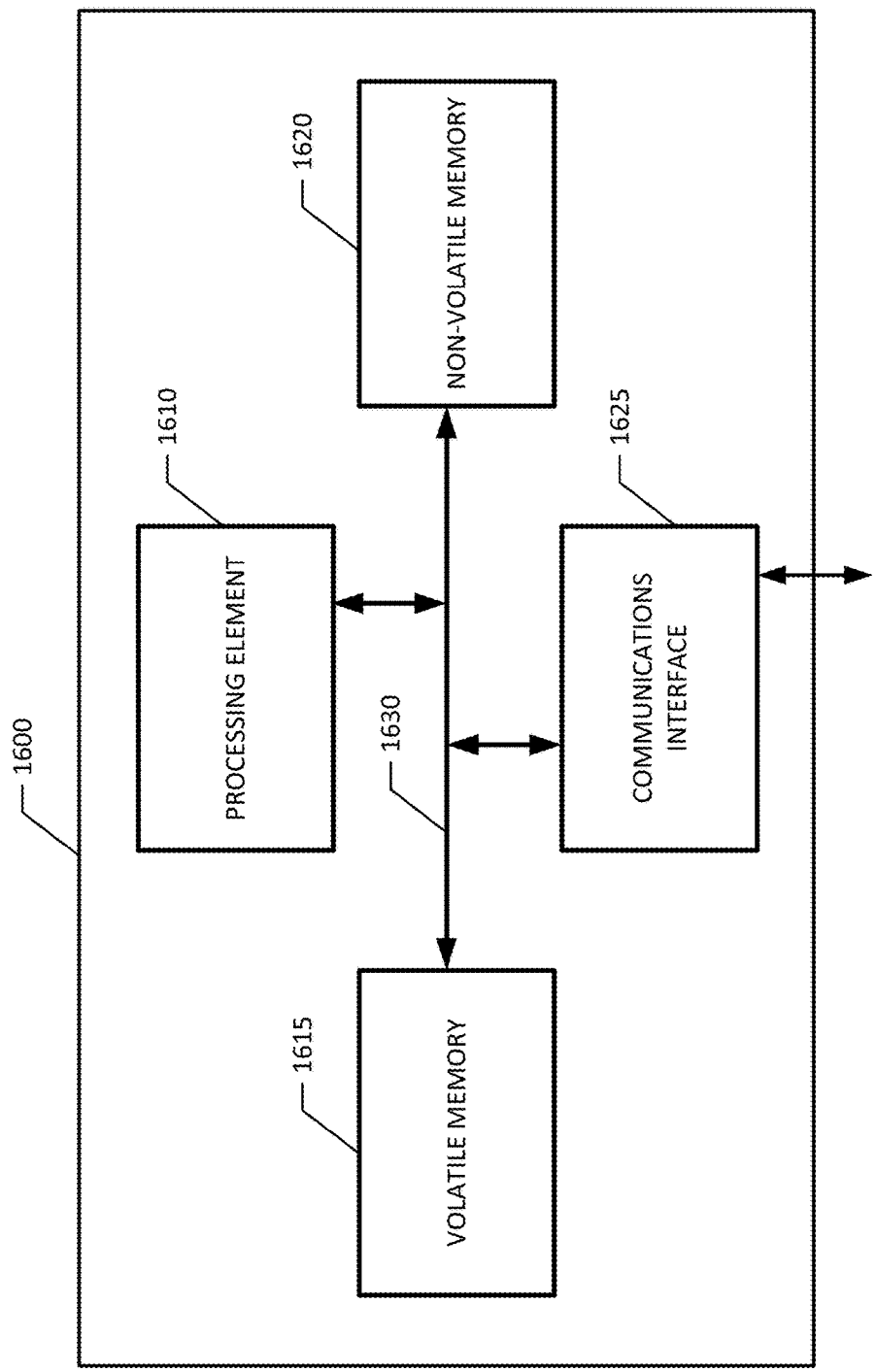
FIG. 16 is a schematic of a computing entity that may be used in accordance with various embodiments of the present disclosure.

FIG. 16 provides a schematic of a computing entity 1600 that may be used in accordance with various embodiments of the present invention. For instance, the computing entity 1600 may be the controlling computer 1550 found within the SEM system 1500 previously described in FIG. 15. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the computing entity 1600 shown in FIG. 16 may be embodied as a plurality of computing entities, tools, and/or the like operating collectively to perform one or more processes, methods, and/or steps. As just one non-limiting example, the computing entity 1600 may comprise a plurality of individual data tools, each of which may perform specified tasks and/or processes.

Depending on the embodiment, the computing entity 1600 may include one or more network and/or communications interfaces 1625 for communicating with various computing entities, such as by communicating data, content, information, and/or similar terms used herein interchangeably that can be transmitted, received, operated on, processed, displayed, stored, and/or the like. Thus, in certain embodiments, the computing entity 1600 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 1600 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 1600 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 1600 includes or is in communication with one or more processing elements 1610 (also referred to as processors, processing circuitry, and/or similar terms used herein interchangeably) that communicate with other elements within the computing entity 1600 via a bus 1630, for example, or network connection. As will be understood, the processing element 1610 may be embodied in several different ways. For example, the processing element 1610 may be embodied as one or more complex programmable logic devices (CPLDs), microprocessors, multi-core processors, coprocessing entities, application-specific instruction-set processors (ASIPs), and/or controllers. Further, the processing element 1610 may be embodied as one or more other processing devices or circuitry. The term circuitry may refer to an entirely hardware embodiment or a combination of hardware and computer program products. Thus, the processing element 1610 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 1610 may be configured for a particular use or configured to execute instructions stored in volatile or non-volatile media or otherwise accessible to the processing element 1610. As such, whether configured by hardware, computer program products, or a combination thereof, the processing element 1610 may be capable of performing steps or operations according to embodiments of the present invention when configured accordingly.

In various embodiments, the computing entity 1600 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 1620 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 1620 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the memory media 1620 may also be embodied as a data storage device or devices, as a separate database server or servers, or as a combination of data storage devices and separate database servers. Further, in some embodiments, the memory media 1620 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage in which some or all the information/data required for various embodiments of the invention may be stored.

In various embodiments, the computing entity 1600 may further include or be in communication with volatile media (also referred to as volatile storage, memory, memory storage, memory circuitry and/or similar terms used herein interchangeably). For instance, the volatile storage or memory may also include one or more volatile storage or memory media 1615 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 1615 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 1610. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 1600 with the assistance of the processing element 1610 and operating system.

As will be appreciated, one or more of the computing entity's components may be located remotely from other computing entity components, such as in a distributed system. Furthermore, one or more of the components may be aggregated and additional components performing functions described herein may be included in the computing entity 1600. Thus, the computing entity 1600 can be adapted to accommodate a variety of needs and circumstances.

E. EXEMPLARY IMAGE PROCESSING FOR SEGMENTATION OF SEM IMAGES

The functionality described herein may be carried out on the computing entity 1600 such as the controlling computer 1550 previously described in FIG. 15. Accordingly, the computing entity 1600 may carry out the functionality as logical operations and these logical operations may be implemented (1) as a sequence of computer implemented acts or one or more program modules running on the computing entity and/or (2) as interconnected machine logic circuits or circuit modules within the computing entity. The implementation is a matter of choice dependent on the performance and other requirements of the computing entity 1600. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Figure 17:
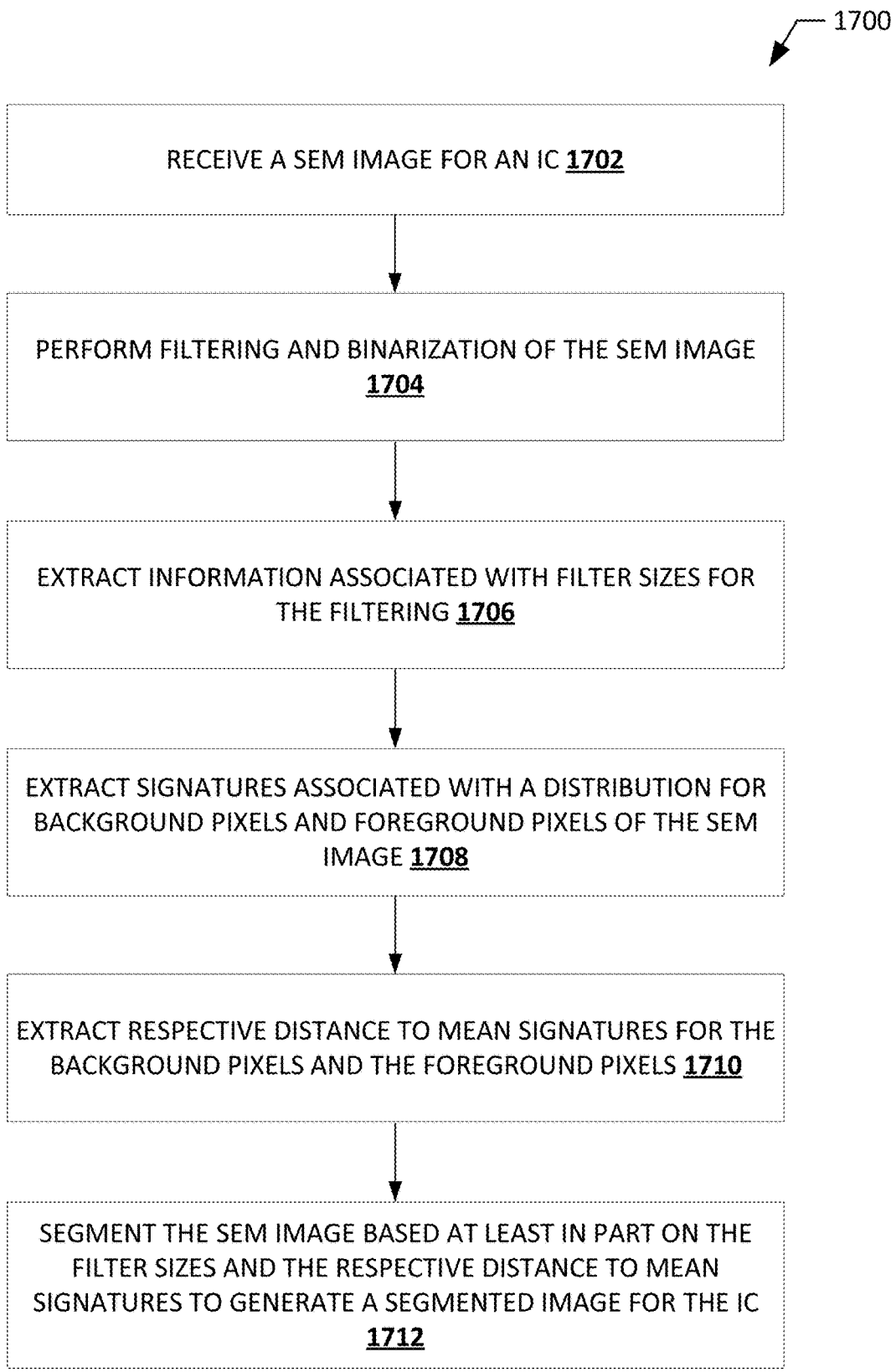
FIG. 17 is a flowchart diagram of an example process for segmenting a SEM image of an integrated circuit in accordance with various embodiments of the present disclosure.

Thus, a flowchart diagram of an example process 1700 is shown in FIG. 17 for segmenting a SEM image of an integrated circuit (IC) according to various embodiments of the invention. Here, the imaging modality (e.g., SEM) 1510 generates a raw image of a sample such as, for example, a surface of an IC. The process 1700 includes a number of steps/operations, as described in the following text. The process 1700 begins at step/operation 1702 when the computing entity 1600 receives a SEM image for an IC.

At step/operation 1704, the computing entity 1600 performs filtering and binarization of the SEM image. In certain embodiments, the computing entity 1600 filters the SEM image based at least in part on a first low-pass filter associated with a first cutoff frequency value to generate a first filtered SEM image. Furthermore, in certain embodiments, the computing entity 1600 filters the first filtered SEM image based at least in part on a second low-pass filter associated with a second cutoff frequency value to generate a second filtered SEM image. In certain embodiments, the computing entity 1600 filters the SEM image based at least in part on a low-pass filter to generate a filtered SEM image. Furthermore, in certain embodiments, the computing entity 1600 applies the filtered SEM image to a Gaussian Mixture Model configured to generate a binarized SEM image.

At step/operation 1706, the computing entity 1600 extracts information associated with filter sizes for the filtering. In certain embodiments, the computing entity 1600 determines an absolute sum of a difference in pixel intensity between the first filtered SEM image and the second filtered SEM image.

At step/operation 1708, the computing entity 1600 extracts signatures associated with a distribution for background pixels and foreground pixels of the SEM image. In certain embodiments, the computing entity 1600 extracts the one or more signatures from the binarized SEM image. In certain embodiments, the computing entity 1600 determines foreground texture data associated with the foreground pixels and/or determines background texture data associated with the background pixels. Furthermore, in certain embodiments, the computing entity 1600 determines the distribution based at least in part on the foreground texture data and the background texture data.

At step/operation 1710, the computing entity 1600 extracts respective distance to mean signatures for the background pixels and the foreground pixels. The computing entity 1600 can determine distance between the signatures using one or more distance calculation techniques. In certain embodiments, the computing entity 1600 determines a Euclidean distance between the signatures. However, it is to be apricated that, in certain embodiments, another type of distance calculation technique can be employed to determine distance between the signatures. In certain embodiments, the computing entity 1600 determines a signature for the distribution for the background pixels and the foreground pixels. Furthermore, in certain embodiments, the computing entity 1600 determines a mean signature for the background pixels and foreground pixels. In certain embodiments, the computing entity 1600 also determines a distance between the signature and the mean signature.

At step/operation 1712, the computing entity 1600 segments the SEM image based at least in part on the filter sizes and the respective distance to mean signatures to generate a segmented image for the IC. In certain embodiments, the computing entity 1600 performs an optimization process of the filter sizes and the respective distance to mean signatures to determine an optimal cutoff frequency value for a low-pass filter. Furthermore, in certain embodiments, the computing entity 1600 segments the SEM image based at least in part on the optimal cutoff frequency value for the low-pass filter to generate the segmented image for the IC. In certain embodiments, the computing entity 1600 calculates a confidence measure for respective pixels of the SEM image. Furthermore, in certain embodiments, the computing entity 1600 populates a data matrix with the confidence measure for the respective pixels. In certain embodiments, the computing entity 1600 also combines the data matrix with a filtered version of the SEM image to generate the segmented image for the IC.

In certain embodiments, the computing entity 1600 splits the SEM image into at least a first sub-image portion of the SEM image and a second sub-image portion of the SEM image based at least in part on a number of threads available to the computing entity 1600 (e.g., based at least in part on a number of threads available to a processor associated with the image processing). In certain embodiments, the computing entity 1600 performing first filtering and binarization of the first sub-image portion. Furthermore, in certain embodiments, the computing entity 1600 performs second filtering and binarization of the second sub-image portion.

In certain embodiments, the computing entity 1600 extracts one or more first signatures associated with a first distribution for first background pixels and first foreground pixels of the first sub-image portion. Furthermore, in certain embodiments, the computing entity 1600 extracts one or more second signatures associated with a second distribution for second background pixels and second foreground pixels of the second sub-image portion. In certain embodiments, the computing entity 1600 combines at least the first sub-image portion and the second sub-image portion to form a segmented version of the SEM image.

F. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for segmenting a Scanning Electron Microscopy (SEM) image of an integrated circuit (IC), the method comprising:
receiving a SEM image for an IC;
performing filtering and binarization of the SEM image;
extracting information associated with filter sizes;
extracting signatures associated with a distribution for background pixels and foreground pixels of the SEM image;
extracting respective distance to mean signatures for the background pixels and the foreground pixels; and
segmenting the SEM image based at least in part on the filter sizes and the respective distance to mean signatures to generate a segmented image for the IC.

2. The method of claim 1, further comprising:
splitting the SEM image into at least a first sub-image portion of the SEM image and a second sub-image portion of the SEM image based at least in part on a number of threads available to a processor associated with the image processing.

3. The method of claim 2, wherein filtering and binarization of the SEM image comprises:
performing first filtering and binarization of the first sub-image portion; and
performing second filtering and binarization of the second sub-image portion.

4. The method of claim 2, wherein extracting the signatures comprises:
extracting one or more first signatures associated with a first distribution for first background pixels and first foreground pixels of the first sub-image portion; and
extracting one or more second signatures associated with a second distribution for second background pixels and second foreground pixels of the second sub-image portion.

5. The method of claim 2, wherein segmenting the SEM image comprises:
combining at least the first sub-image portion and the second sub-image portion to form a segmented version of the SEM image.

6. The method of claim 1, wherein filtering and binarization of the SEM image comprises:
filtering the SEM image based at least in part on a first low-pass filter associated with a first cutoff frequency value to generate a first filtered SEM image; and
filtering the first filtered SEM image based at least in part on a second low-pass filter associated with a second cutoff frequency value to generate a second filtered SEM image.

7. The method of claim 6, wherein extracting the information associated with the filter sizes for the filtering comprises determining an absolute sum of a difference in pixel intensity between the first filtered SEM image and the second filtered SEM image.

8. The method of claim 1, wherein filtering and binarization of the SEM image further comprises:
filtering the SEM image based at least in part on a low-pass filter to generate a filtered SEM image; and
applying the filtered SEM image to a Gaussian Mixture Model configured to generate a binarized SEM image.

9. The method of claim 8, wherein extracting the signatures comprises extracting the one or more signatures from the binarized SEM image.

10. The method of claim 1, wherein extracting the signatures comprises:
determining foreground texture data associated with the foreground pixels;
determining background texture data associated with the background pixels; and
determining the distribution based at least in part on the foreground texture data and the background texture data.

11. The method of claim 1, wherein extracting the respective distance to mean signatures comprises determining a Euclidean distance between the signatures.

12. The method of claim 1, wherein extracting the respective distance to mean signatures comprises:
determining a signature for the distribution for the background pixels and the foreground pixels;
determining a mean signature for the background pixels and foreground pixels; and
determining a distance between the signature and the mean signature.

13. The method of claim 1, wherein segmenting the SEM image comprises:
performing an optimization process of the filter sizes and the respective distance to mean signatures to determine an optimal cutoff frequency value for a low-pass filter; and
segmenting the SEM image based at least in part on the optimal cutoff frequency value for the low-pass filter to generate the segmented image for the IC.

14. The method of claim 1, wherein segmenting the SEM image comprises:
calculating a confidence measure for respective pixels of the SEM image;
populating a data matrix with the confidence measure for the respective pixels; and
combining the data matrix with a filtered version of the SEM image to generate the segmented image for the IC.

15. An apparatus for segmenting a Scanning Electron Microscopy (SEM) image of an integrated circuit (IC), the apparatus comprising at least one processor and at least one memory including program code, the at least one memory and the program code configured to, with the at least one processor, cause the apparatus to at least:
receive an SEM image for an IC;
perform filtering and binarization of the SEM image;
extract information associated with filter sizes for the filtering;

extract signatures associated with a distribution for background pixels and foreground pixels of the SEM image;
extract respective distance to mean signatures for the background pixels and the foreground pixels; and
segment the SEM image based at least in part on the filter sizes and the respective distance to mean signatures to generate a segmented image for the IC.

16. The apparatus of claim 15, wherein the at least one memory and the program code are configured to, with the at least one processor, further cause the apparatus to at least:
split the SEM image into at least a first sub-image portion of the SEM image and a second sub-image portion of the SEM image based at least in part on a number of threads available to the at least one processor.

17. The apparatus of claim 15, wherein the at least one memory and the program code are configured to, with the at least one processor, further cause the apparatus to at least:
filter the SEM image based at least in part on a first low-pass filter associated with a first cutoff frequency value to generate a first filtered SEM image;
filter the first filtered SEM image based at least in part on a second low-pass filter associated with a second cutoff frequency value to generate a second filtered SEM image; and
determine an absolute sum of a difference in pixel intensity between the first filtered SEM image and the second filtered SEM image.

18. The apparatus of claim 15, wherein the at least one memory and the program code are configured to, with the at least one processor, further cause the apparatus to at least:
filter the SEM image based at least in part on a low-pass filter to generate a filtered SEM image; and
apply the filtered SEM image to a Gaussian Mixture Model configured to generate a binarized SEM image.

19. The apparatus of claim 18, wherein the at least one memory and the program code are configured to, with the at least one processor, further cause the apparatus to at least:
extract the one or more signatures from the binarized SEM image.

20. The apparatus of claim 15, wherein the at least one memory and the program code are configured to, with the at least one processor, further cause the apparatus to at least:
perform an optimization process of the filter sizes and the respective distance to mean signatures to determine an optimal cutoff frequency value for a low-pass filter; and
segment the SEM image based at least in part on the optimal cutoff frequency value for the low-pass filter to generate the segmented image for the IC.

21. A non-transitory computer storage medium comprising instructions for segmenting a Scanning Electron Microscopy (SEM) image of an integrated circuit (IC), the instructions being configured to cause one or more processors to at least perform operations configured to:
receive an SEM image for an IC;
perform filtering and binarization of the SEM image;
extract information associated with filter sizes for the filtering;
extract signatures associated with a distribution for background pixels and foreground pixels of the SEM image;
extract respective distance to mean signatures for the background pixels and the foreground pixels; and
segment the SEM image based at least in part on the filter sizes and the respective distance to mean signatures to generate a segmented image for the IC.

22. The non-transitory computer storage medium of claim 21, wherein the operations are further configured to:
split the SEM image into at least a first sub-image portion of the SEM image and a second sub-image portion of the SEM image based at least in part on a number of threads available to the one or more processors.

23. The non-transitory computer storage medium of claim 21, wherein the operations are further configured to:
filter the SEM image based at least in part on a first low-pass filter associated with a first cutoff frequency value to generate a first filtered SEM image;
filter the first filtered SEM image based at least in part on a second low-pass filter associated with a second cutoff frequency value to generate a second filtered SEM image; and
determine an absolute sum of a difference in pixel intensity between the first filtered SEM image and the second filtered SEM image.

24. The non-transitory computer storage medium of claim 21, wherein the operations are further configured to:
filter the SEM image based at least in part on a low-pass filter to generate a filtered SEM image;
apply the filtered SEM image to a Gaussian Mixture Model configured to generate a binarized SEM image; and
extract the one or more signatures from the binarized SEM image.

25. The non-transitory computer storage medium of claim 21, wherein the operations are further configured to:
perform an optimization process of the filter sizes and the respective distance to mean signatures to determine an optimal cutoff frequency value for a low-pass filter; and
segment the SEM image based at least in part on the optimal cutoff frequency value for the low-pass filter to generate the segmented image for the IC.

* * * * *